April 12, 1966 W. P. KUSHMUK 3,245,292
LATHE
Filed May 28, 1963 7 Sheets-Sheet 1
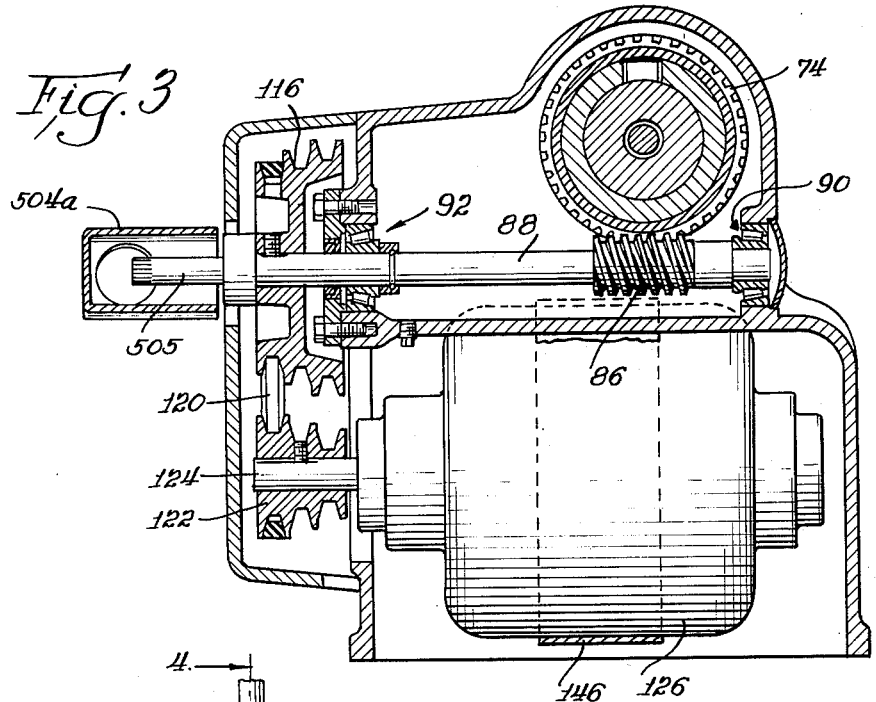
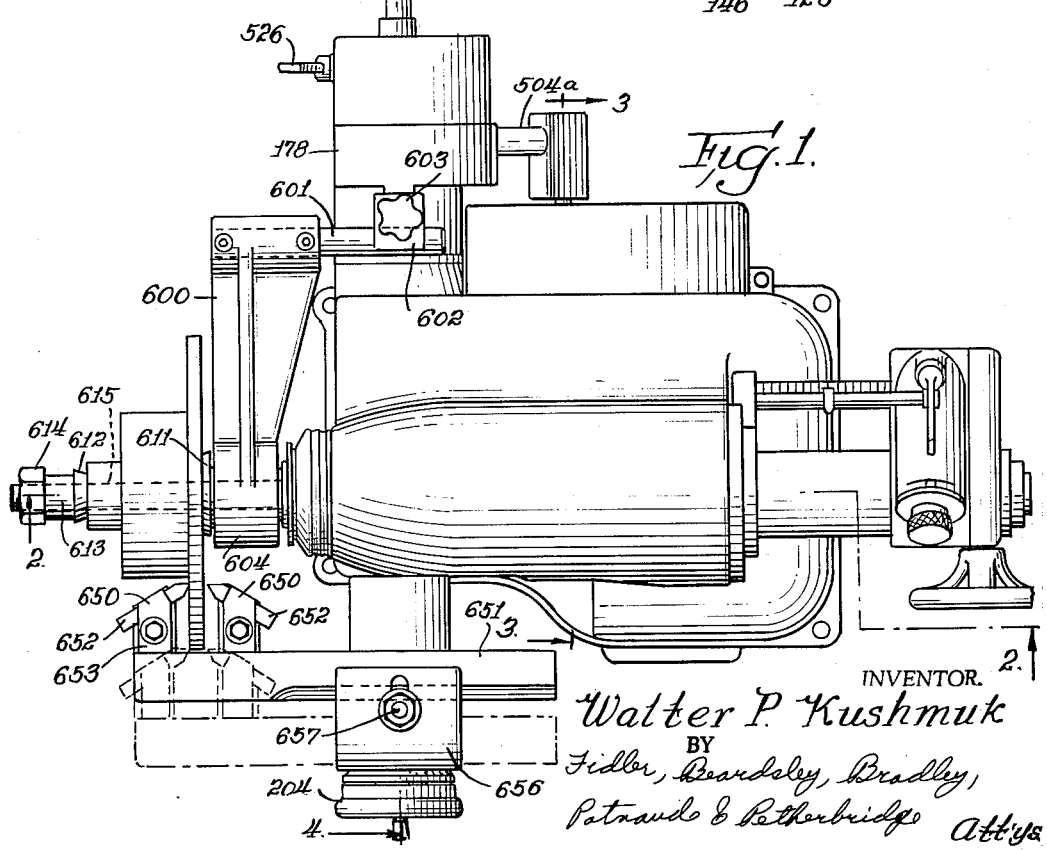
INVENTOR.
Walter P. Kushmuk
BY
Fidler, Beardsley, Bradley,
Patnaude & Petherbridge
Att'ys

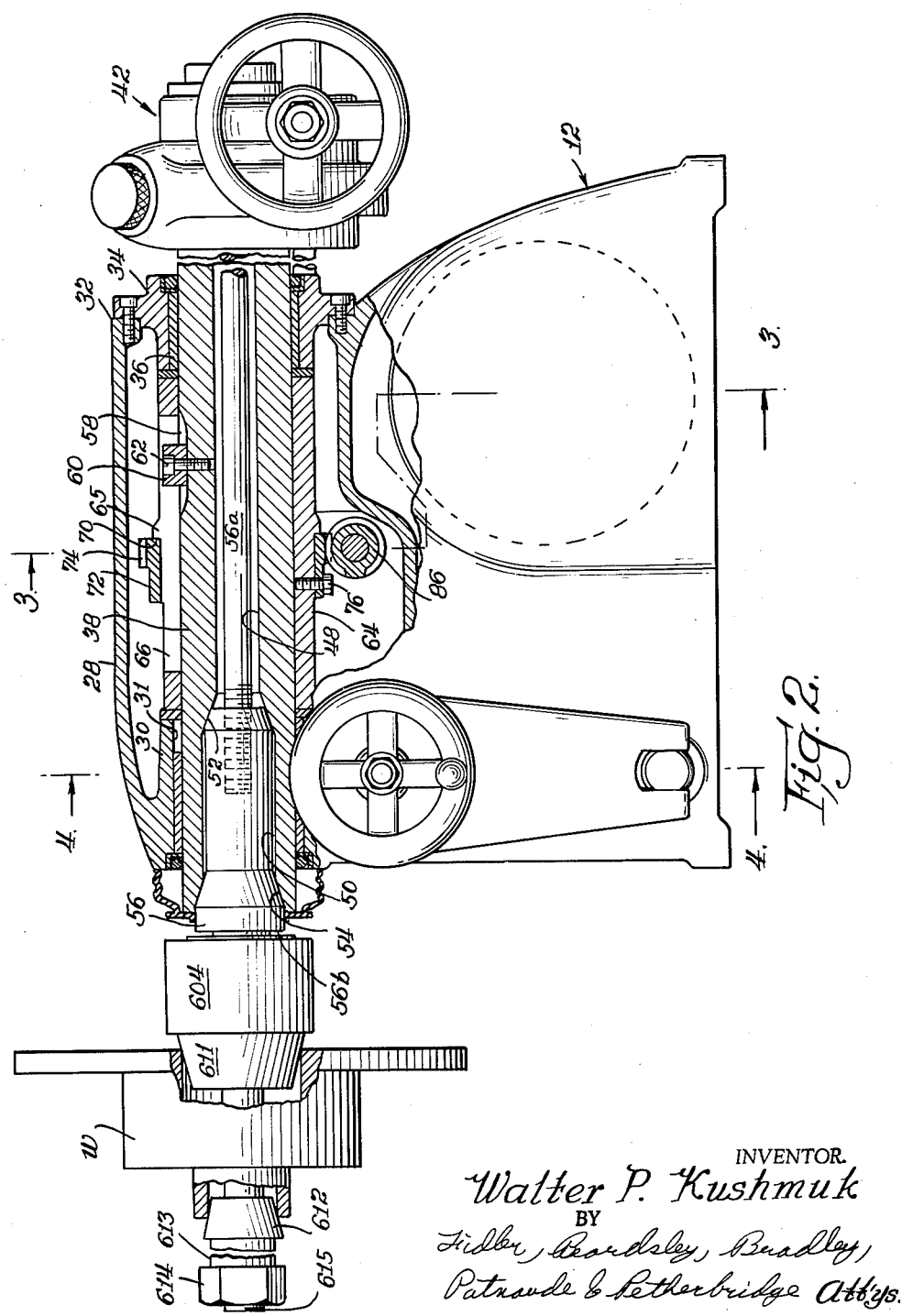

April 12, 1966 W. P. KUSHMUK 3,245,292
LATHE
Filed May 28, 1963 7 Sheets-Sheet 3

INVENTOR.
Walter P. Kushmuk
BY
Fidler, Beardsley, Bradley,
Patnaude & Petherbridge Attys.

April 12, 1966 W. P. KUSHMUK 3,245,292
LATHE
Filed May 28, 1963 7 Sheets-Sheet 4

INVENTOR.
Walter P. Kushmuk
BY
Filler, Beardsley, Bradley,
Patnaude & Petherbridge Attys.

April 12, 1966 W. P. KUSHMUK 3,245,292
LATHE
Filed May 28, 1963 7 Sheets-Sheet 5
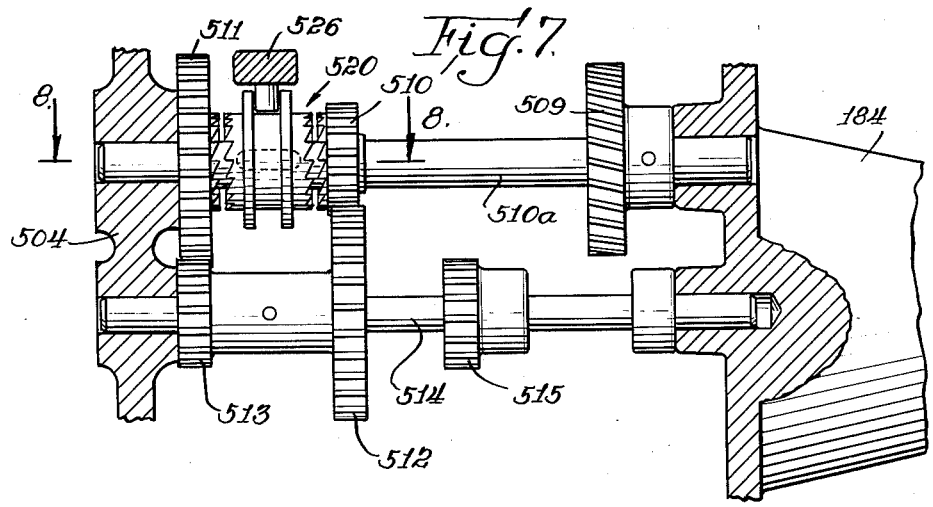
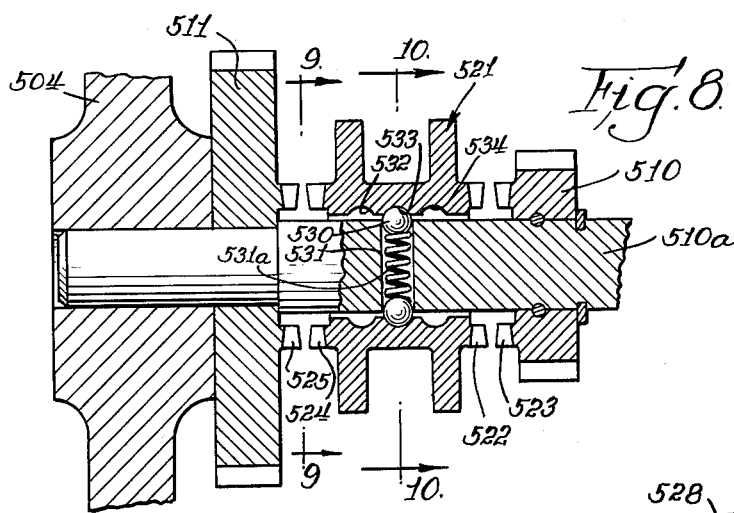
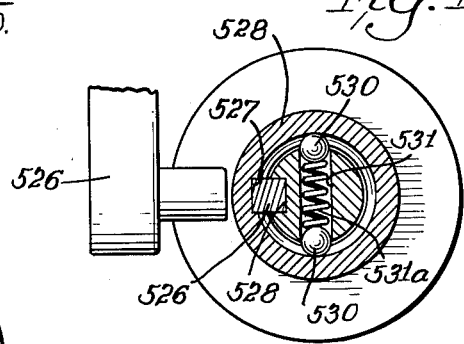
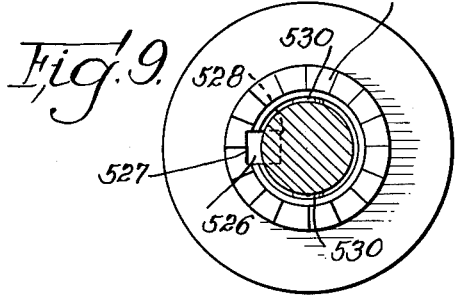
INVENTOR.
Walter P. Kushmuk
BY
Fidler, Beardsley, Bradley,
Patnaude & Petherbridge Attys.

April 12, 1966  W. P. KUSHMUK  3,245,292
LATHE
Filed May 28, 1963  7 Sheets-Sheet 6

INVENTOR.
Walter P. Kushmuk
BY
Fiedler, Beardsley, Bradley,
Patnaude & Petherbridge
Att'ys.

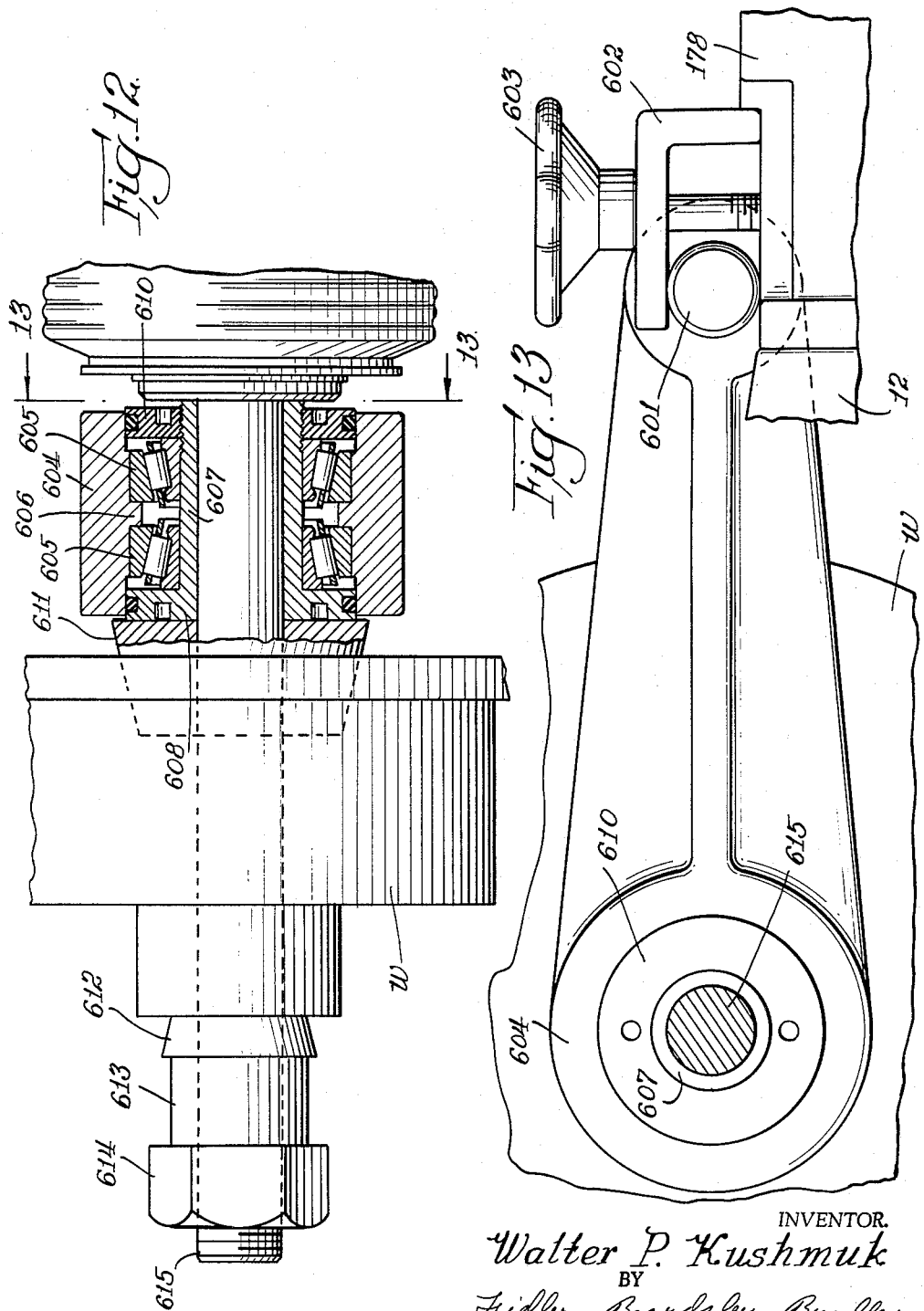

United States Patent Office 3,245,292
Patented Apr. 12, 1966

3,245,292
LATHE
Walter P. Kushmuk, Niles, Ill., assignor to Ammco Tools, Inc., Chicago, Ill., a corporation of Illinois
Filed May 28, 1963, Ser. No. 283,886
3 Claims. (Cl. 82—24)

This invention relates to lathes and has to do more particularly with a lathe having a novel cross feed means for feeding a cutting tool transversely to the axis of the lathe spindle.

One example of a lathe of the general type to which the present invention relates is disclosed in United States Letters Patent No. 2,891,435 to H. R. Billeter, dated June 23, 1959. The aforesaid Billeter patent discloses a lathe in which the spindle is rotated about its axis and is fed in the direction of its axis of rotation in order to machine the workpiece. Such a lathe while of more general application is especially well adapted to machine automotive brakedrums. The tool holder is arranged to be adjusted manually in a direction transversely to the axis of the spindle.

Recently, there has been developed automotive brakes of the disk type, one member of which (usually called the "disk") includes a hub and a flange or disk extending therefrom against the two opposite faces of which the co-operating brake members are adapted to be urged in order to produce the braking action. Such disks require that the two opposite faces thereof be accurately disposed and truly parallel. To this end the disk faces are usually machined.

In accordance with the present invention, a cross feed is provided which drives the cutting tool in a direction transversely to the axis of rotation of the lathe spindle in order to machine the two faces of the workpiece. In the preferred embodiment of the invention, the cross feed takes the form of an attachment to a lathe whereby the tool holder is mechanically driven from the main drive of the lathe, the spindle being rotated about the axis but not fed in an axial direction. The cross feed of this invention while of general application is especially suitable for use in machining disk brakes. More particularly, the cross feed is so constructed that it can quickly and easily be attached to a lathe of known construction without modification of either the lathe or the cross feed.

An object of the present invention is to provide a lathe having a new and improved cross feed mechanism.

Another object is to provide a novel cross feed mechanism for a lathe which can be quickly and easily attached to a lathe of known construction.

A further object is to provide a cross feed mechanism for a lathe which is supported on the lathe by the lead screw nut of the cross feed mechanism.

A further object is to provide a cross feed mechanism for a lathe which cannot be damaged even though it is permitted to be driven after it has reached the end of its travel.

Other objects and advantages of the invention will appear from the following description taken in connection with the appended drawings wherein:

FIGURE 1 is a top plan view of the lathe in accordance with the invention;

FIG. 2 is a front elevational view partly in cross section of the device of FIG. 1;

FIG. 3 is a sectional view taken along lines 3—3 of FIG. 1;

FIG. 7 is an enlarged fragmentary view of a portion of the auxiliary drive mechanism;

FIG. 8 is an enlarged fragmentary sectional view taken along line 8—8 of FIG. 7;

FIG. 9 is a sectional view taken along line 9—9 of FIG. 8.

FIG. 10 is a sectional view taken along line 10—10 of FIG. 8.

FIG. 12 is an enlarged elevational view partly in section showing particularly the bearings forming a part of the spindle lock; and FIG. 13 is an enlarged view showing the spindle lock supporting means.

Figure 4:
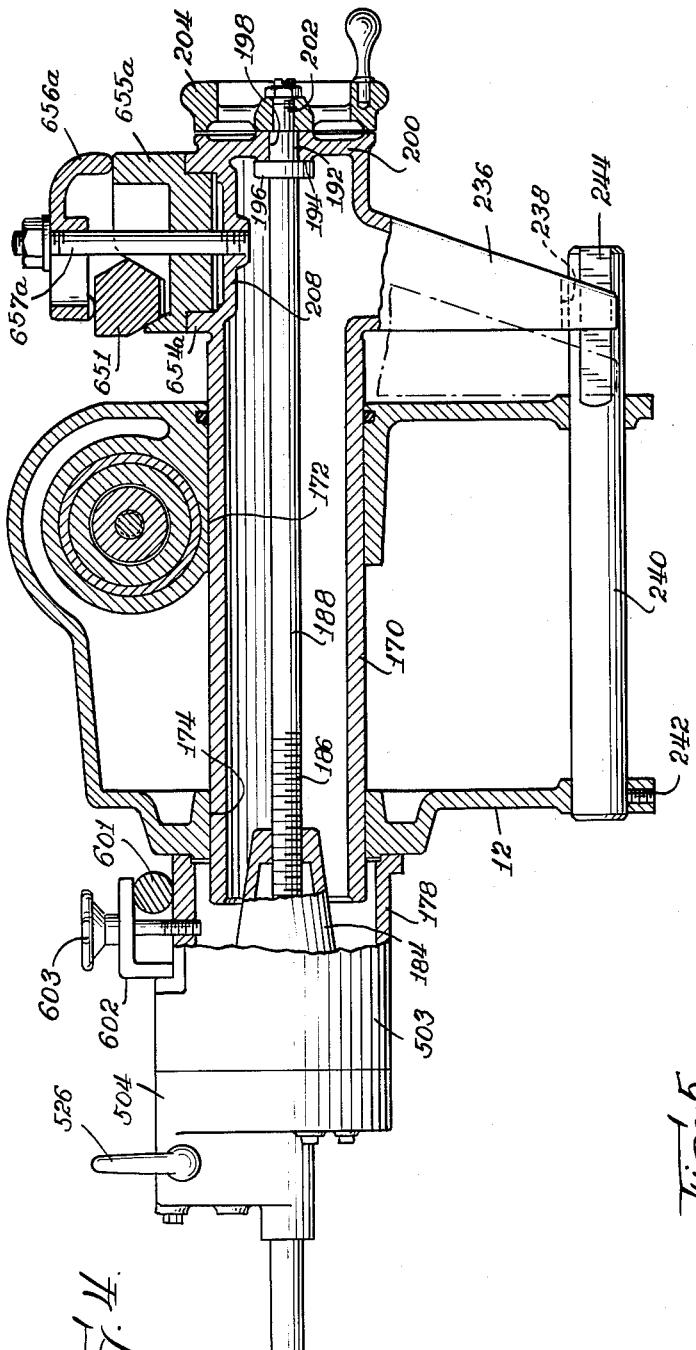
FIG. 4 is an end elevational view partly in cross section of the device of FIG. 1.

Referring now to FIG. 2, the lathe includes a frame or stand 12 on which the other parts are mounted. The casing 12 is formed with an upper portion 28 having aligned openings one of which is surrounded by an internal tubular portion 30 having a bearing bore 31 and extending inwardly toward the opposite end 32. Detachably mounted on the open end 32 is a flanged bearing member 34 having a bearing 36 in axial alignment with the bearing 31. The bearings receive and rotatably support a spindle 38.

The spindle is mounted in the frame for rotational and longitudinal or axial feed movement therein.

The means for effecting rotation of the spindle is a worm 86 (FIG. 3) in mesh with the worm gear 74 mounted on a transverse shaft 88 adjacent the bottom of the gear 74 and mounted in the opposite walls of the casing in bearings 90 and 92. A pulley 122 is mounted on the shaft 124 of the eletcric motor 126 and connected by a belt 120 to a pulley 116 on the shaft 88. As seen, the belt which is in corresponding grooves in the two pulleys may be moved to the other grooves to provide a different drive ratio. The motor is suitably mounted in a casing by a strap 146.

The spindle 38 is preferably hollow having a small diameter bore 48 terminating in an enlarged diameter portion 50 including an inner tapered portion 52 and outer tapered portion 54, which portions form a double taper for receiving an arbor 56. The arbor carries a draw bar 56a provided with a nut (not shown) at its outer end in order to secure the arbor in the spindle 38. Rotation of the spindle effects similar rotation of the arbor.

The spindle has an axial key way 58 in its periphery for receiving a key 60 which is secured in the key way by appropriate means such as a screw 62 for cooperation with a quill 64 surrounding the spindle. The quill 64 is tubular in shape and is so dimensioned as to have a sliding fit with the spindle. The quill is provided with a slot 66 extending through the wall thereof for receiving the key 60 for relative sliding movement of the key in the slot in response to the axial movement of the spindle while the quill is restrained against axial or longitudinal movement. The quill provides means for imparting rotation to the spindle through the medium of engagement of the key 60 with a side wall of the slot 66 and as the spindle is rotated the feed means produces the axial or longitudinal feed movement of the spindle.

Positioned suitably on the quill 64 intermediate its ends is a circumferential rib 65 having a shoulder 70 against which is abutted a ring gear 72 having worm gear teeth 74 surrounding the quill and secured thereto by suitable means such as the screw 76.

The means for imparting rotation to the spindle includes a worm 86 in mesh with the worm gear 74 and mounted on a transverse shaft 88 adjacent the bottom of the gear 74. Thus, upon rotation of the motor 126, the quill and consequently the spindle are rotated about their common axis. It will be understood that the feed means 42 (not shown) for feeding the spindle axially can be disconnected so that there is only rotary motion of the quill and spindle and no longitudinal feed movement.

Figure 5:
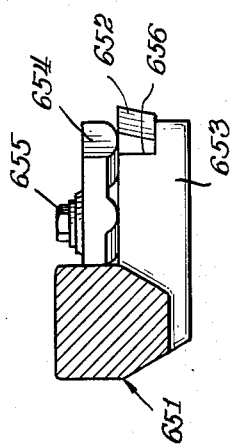
FIG. 5 is a detail of construction.

The lathe is provided with cutting means including a pair of clamps 650 (FIGS. 1 and 5) mounted on a cutter bar 651 which clamps are adapted to hold cutting tools 652 with their bits in opposed relation and spaced apart in a direction parallel to the axis of the arbor. Each clamp includes an arm 653 which is integral with the cutter bar and extends laterally therefrom, a clamping member 654, and a bolt 655 which extends through the member 653 and the member 654 and secured by a nut (not shown). As seen in FIG. 5, the arm 653 is provided with an edge notch 656 in which the tool bit is seated and held by the member 654.

The mounting means for the cutting tools includes a tubular element 170 (FIG. 4) slidably mounted in aligned bores 172 and 174 formed in the frame.

Bore 174 is closed by the cap or casing 178 of the auxiliary cross feed mechanism 503 described hereinafter. The cross feed mechanism 503 is suitably secured to the stand 12 by screws (not shown). The casing 178 has substantial axial length and has a central portion 184 extending in a return direction with a central threaded hole 186 (FIG. 4) for receiving the threaded end of a cross feed shaft 188. The shaft 188 at its end opposite to cap 178 has a reduced diameter portion 192 on which is fitted a collar 196 in abutment with the shoulder 194, the portion 192 being preferably knurled for restraining the collar for rotation with the shaft. The reduced portion 192 has bearing support in a bore 198 and outwardly of the wall 200 the shaft is further reduced at 202 for receiving a hand wheel 204.

The tubular element 170 at its outer end has a top wall element 208 with an upstanding flange 654a which receives a lower clamping element 655a for adjustably mounting the cutter bar. An upper clamp element 656a is provided which is secured in place by a screw 657a threaded into the wall 208. The cutter bar 651 is six-sided and the flange of the lower clamp member 655 is suitably shaped to receive the cutter bar 651 and hold the latter in fixed position when the upper clamp element 656 is held in its proper position by the screw 657. The screw 657 can be loosened to permit adjustment of the cutter bar 651 in a direction parallel to the axis of the spindle.

Extending downwardly from the outer end of the tubular element 170 is a guide leg 236 having a notch 238 in its lower end for receiving the outer end of a shaft 240 suitably positioned in the wall elements of the frame and held therein by a set screw 242. The outer end of the shaft is flattened as at 244 for receiving the side surfaces of the notch 238 for guiding movement of the leg 236 in the adjusting movement of the feed means.

Figure 6:
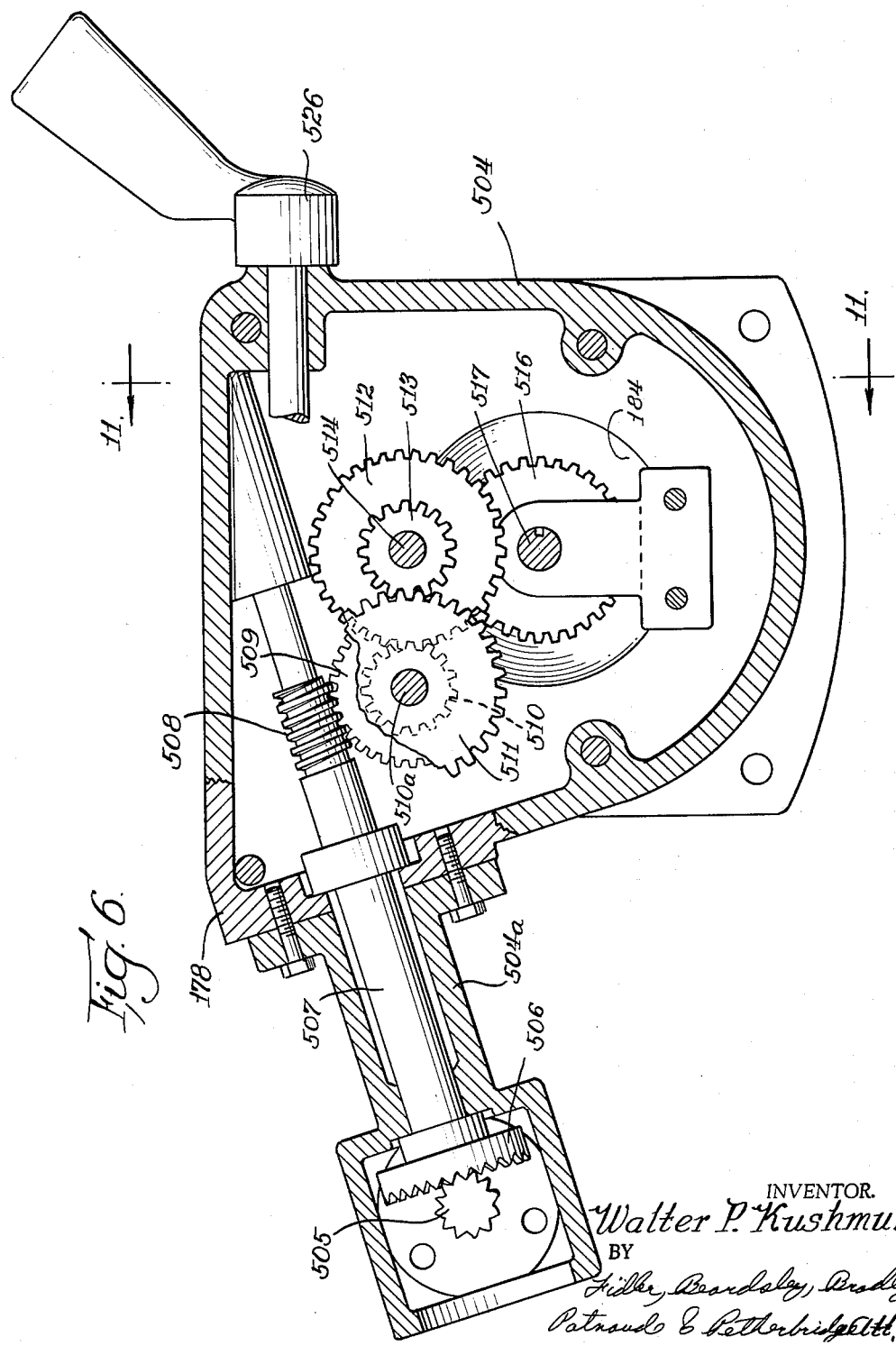
FIG. 6 is an enlarged sectional view showing the auxiliary drive mechanism.
Figure 11:
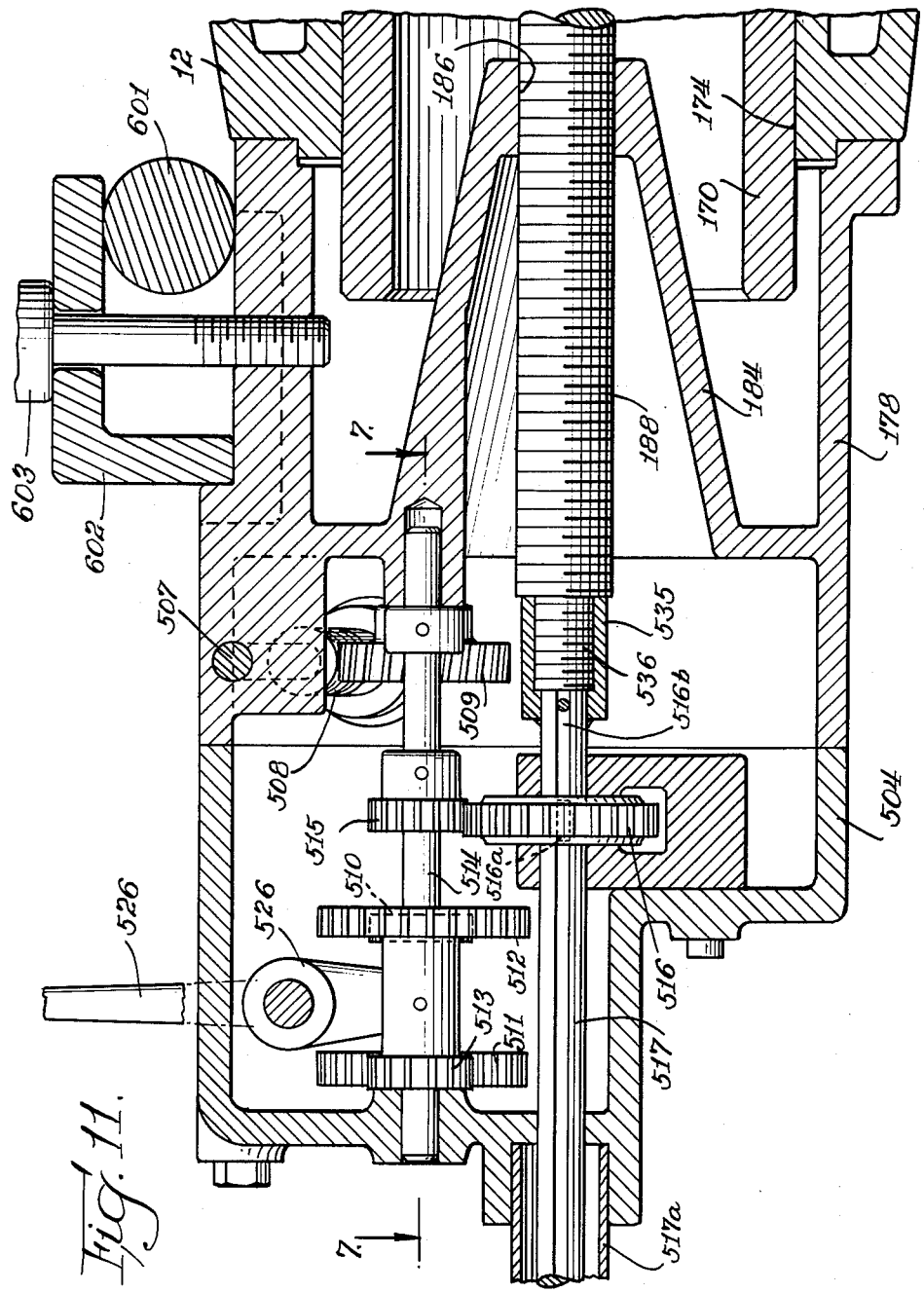
FIG. 11 is an enlarged sectional view of the auxiliary drive and its casing.

The auxiliary drive mechanism or cross feed mechanism (FIG. 6) includes the lead nut 178 which forms a portion of the casing for the mechanism and a casing section 504 connected by screws (not shown) to the lead screw nut 178. The cross feed mechanism includes a shaft driven from the motor shaft 124 which carries a spur gear 505 meshing with the crown gear 506 driving a shaft 507. The gears 505 and 506 and the shaft 507 are housed in a housing 504a attached to the casing 178 by screws 504b. The shaft 507 carries a worm 508 which in turn drives a worm gear 509. The worm gear 509 (see FIG. 7) is carried on a shaft 510a which carries a small gear 510 and a larger gear 511 meshing respectively with a larger gear 512 and a smaller gear 513 carried on a shaft 514. The shafts 510a and 514 are journaled in the housing members 504 and 178. The shaft 514 (FIG. 11) carries a gear 515 which meshes with the gear 516 keyed by a key 516a and slot 516b on a shaft 517 journaled in the housing section 504. A shaft guard 517a is secured in the casing section 504 to protect the shaft 517.

The gears 510 and 511 are mounted freely on the shaft 510a and rotate thereon only when engaged by the one-way clutch 520 now to be described. As seen particularly in FIG. 8, the clutch includes a clutch member 521 having at one end a series of teeth 522 for engagement with the teeth 523 of the gear 510. At its other end, the clutch 521 has a series of teeth 524 adapted to engage with the teeth 525 on the larger gear 511.

The clutch 521 is movable axially on the shaft 510a between a position engaged with the gear 510 or an intermediate position in which it does not engage with either of the gears, and a third position in which it engages with the gear 511. The clutch is adapted to be manually operated by a handle 526 projecting out of the casing. The clutch thus provides two different drive ratios, namely, a "fast" drive and a "slow" drive. In the intermediate or neutral position, it does not drive. This neutral position is used where the operator turns the handwheel 204 to move the tool carrier 170 to the starting position wherein the tools are nearer to the axis of the spindle.

The clutch 521 is restrained against rotation on the shaft 510a by a key 526 which is engaged in slots 527 and 528 in the clutch and shaft respectively.

The clutch is held in any one of its three positions of adjustment by balls or detent 530 projecting from a bore 531 in the shaft and urged outwardly by a spring 531a in the bore. The clutch member 521 is provided with notches 532 and 533 and 534 engageable by the balls 530 when the clutch member 521 is moved into any one of its three respective positions of adjustment to hold the clutch member in such position.

The driven gear 516 is keyed to the shaft 517 so as to permit sliding movement of the shaft relatively to the gear 516. At its inner end, the shaft 517 carries a socket 535 threaded to receive the reduced threaded end 536 of the lead screw 188. Thus, a detachable connection between the auxiliary driving mechanism and the lead screw is provided. In this connection, it will be noted that the socket 535 and shaft 517 both are smaller in diameter than the main portion of the lead screw 188 and thus no damage can occur even though the operator rotates the lead screw to such an extent that the socket 535 passes into or through the threaded opening 186 in the lead screw nut 184.

The invention also provides means for locking the spindle against any longitudinal movement, it being understood, of course, that the feed drive for the spindle is disconnected. This locking means includes an arm 600 (FIG. 1) carried by a rod 601 which is clamped against the auxiliary feed mechanism housing 503 by an L-shaped clamp 602 secured by a screw 603 threaded into the lead screw nut 178. The arm 600 has a bearing portion 604 through which the arbor 56 extends. Secured in the portion 604 is a pair of oppositely inclined roller bearings 605 separated by an internal flange 606. Journaled in the bearings 605 is a sleeve 607 which has a flange 608 at its outer end which flange serves to retain the adjacent bearing firmly in place. The other end of the sleeve 607 is threaded and receives a closure nut 610 which closes the bearing portion 604 and firmly holds the adjacent bearing 605 against the flange or rib 606. The threaded (right-hand) end of the sleeve 609 is in abutment with a shoulder 56b on the arbor 56.

The workpiece W is secured on the arbor by a first member 611 (FIG. 12) having a conical outer surface for engaging the bore in the workpiece, a second member 612 having a conical surface adapted to engage the other end of the bore, a spacer 613 and a nut 614 screwed on the threaded end 615 of the arbor. The assembly consisting of the nut 614, spacer member 613, conical member 612, workpiece W and conical member 611, is held in tight contact and the member 611 abuts the face of the flange 608 of the sleeve 607. The sleeve 607 in turn abuts the shoulder 56b on the adjacent end of the arbor so that the workpiece is held firmly on the arbor and against any shifting in a direction parallel to the axis of the arbor.

In the use of the lathe, according to the present invention, the workpiece is secured on the arbor as seen particularly in FIGS. 2 and 12 with the inner end of the sleeve 607 firmly abutting the shoulder on the arbor. The tubular member 170 is moved toward the front of the lathe (to the right as viewed in FIG. 4) to permit the workpiece to be installed on the arbor. Thereafter the tubular member 170 is advanced to bring the cutting tools 502 opposite the flange on the workpiece. However, the tools are adjusted so that only one tool is in engagement with the workpiece flange at one time. The cutter bar thus is adjusted so that one bit engages the adjacent face of the workpiece flange toward the center. The electric motor is then energized which rotates the quill 38 and the arbor carrying the workpiece. Upon energization of the electric motor, the cross feed is energized to rotate the feed screw 188 and advance the tubular member 170 so that the cutting tool which is engaged with the workpiece moves outwardly and machines the adjacent surface of the flange. When the machining operation has been completed, the lathe is halted and the tubular member 170 is backed off to insure that the cutting tools 502 are outwardly beyond the workpiece of the flange. Thereafter, the cutter bar is adjusted so that the first cutting tool 502 is moved to a position where it will not engage the flange and the other cutting tool is moved into a position where it will engage in cutting relation with the face of the flange opposite to the face which has just been machined. Thereafter, the machining operation is carried out to machine the second face of the flange of the workpiece.

For the purposes of illustration, the invention is disclosed in connection with a lathe such as is disclosed in United States Patent No. 2,891,435 to Henry Robert Billeter, but it will be understood that it is not limited to use in connection with such lathe. Certain features disclosed but not claimed herein are disclosed and claimed in my co-pending application Serial No. 283,938, filed May 28, 1963.

I claim:

1. A cross-feed attachment for use with a lathe having a main drive means and a tool holder movable transversely to the spindle of the lathe and driven by a transverse lead screw comprising:
    a casing connected to said lathe in axial alignment with the lead screw,
    a lead screw nut secured to said casing for engagement with the lead screw,
    means in said casing for receiving and holding one end of the lead screw,
    shaft means journaled in said casing for rotatably supporting the lead screw receiving and holding means,
    gear means in said casing for rotatably driving said shaft means, said gear means being driven by the main drive means of the lathe.

2. A cross-feed attachment as set forth in claim 1 wherein said means for receiving and holding the lead screw is of smaller diameter than the lead screw for free passage through said lead screw nut.

3. A cross-feed attachment as set forth in claim 2 wherein said gear means is of variable speed and includes
    gear means driven by the main drive of the lathe;
    shaft means journalled in said casing and rotatably driven by said gear means;
    first worm gear means on said shaft means;
    second shaft means journalled in said casing;
    second worm gear means supported on said second shaft means in meshing relationship with said first worm gear means;
    clutch means slidably mounted on said second shaft means and fixed against rotation relative thereto;
    large and small gear means on said second shaft means and adapted for free rotation thereon;
    said large and small gear means being adapted for engagement by said clutch means;
    third shaft means journalled in said casing;
    small and large gear means mounted on said third shaft means and fixed against rotation thereon;
    said large and small gear means being inter-meshing relationship;
    driving gear means mounted on said third shaft means;
    fourth shaft means journalled in said casing;
    handle means pivotally mounted on said casing;
    said handle means operating said clutch means to selectively drive one of said gears of said large and small gear means to provide for fast drive, slow drive and to be disengaged from said gear to provide no drive of the lead screw.

References Cited by the Examiner

UNITED STATES PATENTS 2,134,024  10/1938  Bogart.
2,172,999   9/1939  Hoelscher.
2,891,435   6/1959  Billeter.

WILLIAM W. DYER, JR., *Primary Examiner.*